United States Patent
Holt et al.

(10) Patent No.: US 8,579,494 B2
(45) Date of Patent: Nov. 12, 2013

(54) SYSTEM AND METHOD FOR DOUGH EXTRUSION

(75) Inventors: Gerald E. Holt, St. Charles, MO (US); Marshall S. Maddox, Batavia, IL (US)

(73) Assignee: Sara Lee TM Holdings, LLC, Chicago, IL (US)

( * ) Notice: Subject to any disclaimer, the term of this patent is extended or adjusted under 35 U.S.C. 154(b) by 896 days.

(21) Appl. No.: 12/544,863

(22) Filed: Aug. 20, 2009

(65) Prior Publication Data

US 2010/0046318 A1 Feb. 25, 2010

Related U.S. Application Data

(60) Provisional application No. 61/091,154, filed on Aug. 22, 2008.

(51) Int. Cl.
*A21C 1/00* (2006.01)

(52) U.S. Cl.
USPC .................. 366/76.2; 366/76.93; 366/100

(58) Field of Classification Search
USPC .............. 366/79, 76.2, 76.93, 76.1, 100; 425/135, 149, 142; 264/40.3, 40.6, 264/40.7
See application file for complete search history.

(56) References Cited

U.S. PATENT DOCUMENTS

| | | | | |
|---|---|---|---|---|
| 2,649,618 A | * | 8/1953 | Rhodes et al. | 264/40.1 |
| 3,148,231 A | * | 9/1964 | Spencer | 264/40.6 |
| 3,704,972 A | * | 12/1972 | Kneller et al. | 366/79 |
| 3,728,056 A | * | 4/1973 | Theysohn | 425/142 |
| 3,859,022 A | | 1/1975 | Gendron et al. | |
| 3,890,078 A | * | 6/1975 | Straumanis | 425/141 |
| 3,921,963 A | * | 11/1975 | Neff et al. | 366/78 |
| 3,924,840 A | * | 12/1975 | Nelson, Jr. | 366/79 |
| 4,171,193 A | * | 10/1979 | Rahlfs | 425/71 |
| 4,309,114 A | * | 1/1982 | Klein et al. | 366/79 |
| 4,332,538 A | | 6/1982 | Campbell | |
| 4,338,341 A | | 7/1982 | Glass | |
| 4,424,236 A | | 1/1984 | Campbell | |
| 4,449,908 A | | 5/1984 | Campbell | |
| 4,478,775 A | * | 10/1984 | Endo et al. | 264/40.3 |

(Continued)

FOREIGN PATENT DOCUMENTS

| | | |
|---|---|---|
| GB | 2 245 137 | 2/1992 |
| JP | 02-079963 | 3/1990 |
| WO | WO 2004/032632 | 4/2004 |

OTHER PUBLICATIONS

Report on state of the Art and Written Opinion received in corresponding ES Appl. No. 200901899, 5 pages, May 31, 2012.

(Continued)

*Primary Examiner* — Tony G Soohoo
(74) *Attorney, Agent, or Firm* — AlbertDhand LLP

(57) ABSTRACT

A system and method for extrusion of dough is disclosed. The system includes an auger for moving the dough; a metering pump comprising an input; a first motor for actuating the auger to transfer dough to the input of the metering pump; a first encoder for reading a position or speed of the first motor and for transmitting a signal associated with the position or speed of the first motor; and a controller configured to receive the signal from the first encoder to control operation of the first motor. The controller operates the first motor to at least partially counteract a variance in a pressure of dough at the metering pump based signals from the encoder and/or the pressure sensor.

12 Claims, 8 Drawing Sheets

(56) References Cited

U.S. PATENT DOCUMENTS

| | | | |
|---|---|---|---|
| 4,517,212 A | 5/1985 | Campbell | |
| 4,661,364 A | 4/1987 | Campbell | |
| 4,667,852 A * | 5/1987 | Siemann | 425/135 |
| 4,721,589 A * | 1/1988 | Harris | 425/143 |
| 4,813,860 A * | 3/1989 | Jonsson et al. | 425/142 |
| 4,830,219 A * | 5/1989 | Siemann | 425/135 |
| 4,844,296 A * | 7/1989 | Hayashi et al. | 222/1 |
| 4,890,996 A * | 1/1990 | Shimizu | 425/145 |
| 4,948,611 A | 8/1990 | Cummins | |
| 4,960,601 A | 10/1990 | Cummins | |
| 5,046,940 A * | 9/1991 | Cummings | 425/239 |
| 5,179,521 A * | 1/1993 | Edge | 425/145 |
| 5,247,782 A | 9/1993 | Rejsa | |
| 5,283,074 A | 2/1994 | Campbell | |
| 5,443,854 A | 8/1995 | Cummins | |
| 5,518,672 A * | 5/1996 | Luker | 425/145 |
| 5,750,169 A | 5/1998 | Rose et al. | |
| 5,840,345 A | 11/1998 | Ayash | |
| 5,985,346 A | 11/1999 | Ayash | |
| 6,422,854 B1 | 7/2002 | Dennis et al. | |
| 6,441,321 B1 | 8/2002 | Hebenstreit | |
| 7,154,055 B2 | 12/2006 | Hebenstreit | |
| 7,287,973 B2 | 10/2007 | Bodenstorfer | |
| 2004/0005378 A1 * | 1/2004 | Uchiyama et al. | 425/149 |
| 2005/0260320 A1 | 11/2005 | Hannaford | |
| 2010/0046318 A1 * | 2/2010 | Holt et al. | 366/76.2 |

OTHER PUBLICATIONS

Machine translation (via Google's translation website) of Written Opinion for ES Appl. No. 200901899, 2 pages.

AMF, Advanced Dough Divider, bearing a designation of "Jun. 2001", 4 pages.

AMF, Advanced Dough Divider Multi-Metering Pump, bearing a designation of "Sep. 2007", 4 pages.

* cited by examiner

SYSTEM AND METHOD FOR DOUGH EXTRUSION

CROSS REFERENCE TO RELATED APPLICATION

The present application claims priority under 35 U.S.C. §119 from U.S. Provisional Patent Application No. 61/091,154 titled "SYSTEM AND METHOD FOR DOUGH EXTRUSION" filed Aug. 22, 2008, the full disclosure of which is hereby incorporated herein by reference.

BACKGROUND

The present disclosure relates generally to the field of dough extrusion. More specifically, the disclosure relates to compensation for pressure variance during dough extrusion.

Dough (e.g., for bread, buns, or other flour based dough products) can be conventionally divided into smaller pieces (e.g., 16-32 ounces) at speeds ranging from 0 to 200 plus pieces per minute by machine commonly called a Rotary Extrusion Divider or, Advanced Dough Divider, for example as manufactured by AMF, Inc. of Richmond, Va. The Rotary Extrusion Divider conventionally includes an auger (e.g., two screws) contained in a horizontal chamber for kneading and moving the dough to a metering pump, or pumps sometimes via a distribution manifold that can at least partially control the speed of the dough as it is sent to a knife or multiple knifes for cutting at a predetermined size or weight. Other conventional methods of dividing dough may not generally be as accurate and repeatable as a Rotary Extrusion Divider. Despite the Rotary Extrusion Divider being prominent for dividing dough, there has been only been small improvements to the original design of auger screws feeding a pump, or pumps.

Due to the rotational nature of the augers, and the operation of the metering pump, the pressure of the dough entering the metering pump varies. This pressure variation oscillates generally along a repeating wave pattern, which reduces the overall accuracy of the Rotary Extrusion Divider scaling weights and requires that excess or additional dough be included with each dough division according to statistical models of the accuracy and precision of the system performance. Further, this pressure variation is enhanced by the fixed period of the knife relative to the period of the repeating wave pattern.

In recent years, secondary companies have developed add-on machinery to compliment the Rotary Extrusion Divider. The add-on machinery has helped to reduce some of the inherent machine scaling deficiencies. For example, a machine called a Dough Saver manufactured by Bakery Systems, Inc. of Saint Louis, Mo. is essentially a weight checker typically positioned between the Rotary Extrusion Divider and a dough ball conical rounder, or horizontal rounding bars (however, in some cases because of space limitations it is located after the rounder, or bars). The Dough Saver is designed to weigh every dough ball from the Rotary Extrusion Divider, however in some cases 100% weight measurement is not possible. The computer that controls the Dough Saver and its internal algorithms typically provides modulating control to the metering pump(s) based on the dough ball weight measurements. Depending on a predefined set of weight samples taken, the computer will change the pump speed to vary the weight. However, even with the use of a Dough Saver variability of weights still exists.

SUMMARY

One embodiment of the disclosure relates to a system for extrusion of dough. The system comprises an auger for moving the dough; a metering pump comprising an input; a first motor for actuating the auger to transfer dough to the input of the metering pump; a first encoder for reading a position or speed of the first motor and for transmitting a signal associated with the position or speed of the first motor; and a controller configured to receive the signal from the first encoder to control operation of the first motor. The controller operates the first motor to at least partially counteract a variance in a pressure of dough at the metering pump.

Another embodiment of the disclosure relates to a method for controlling extrusion of dough. The method comprises actuating an auger with a motor; transferring dough to an input of a metering pump using the auger; and operating the motor using the controller to at least partially counteract a variance in a pressure of dough at the metering pump. The method may include reading a position or speed of the first motor using an encoder, and transmitting a signal associated with the position or speed of the first motor from the encoder to a controller. The method may further comprise operating the motor based on the signal associated with the variance in pressure and based on the signal from the encoder.

Another embodiment of the disclosure relates to a system for extrusion of dough. The system comprises an auger; a metering pump comprising an input; a first motor for actuating the auger to transfer dough to the input of the metering pump; a controller configured to control operation of the first motor; and a pressure sensor configured to detect a pressure of the dough and configured to transmit a signal associated with the pressure to the controller. The controller operates the motor to at least partially compensate for a variance in the pressure of dough

DETAILED DESCRIPTION OF THE EXEMPLARY EMBODIMENTS

Figure 1:
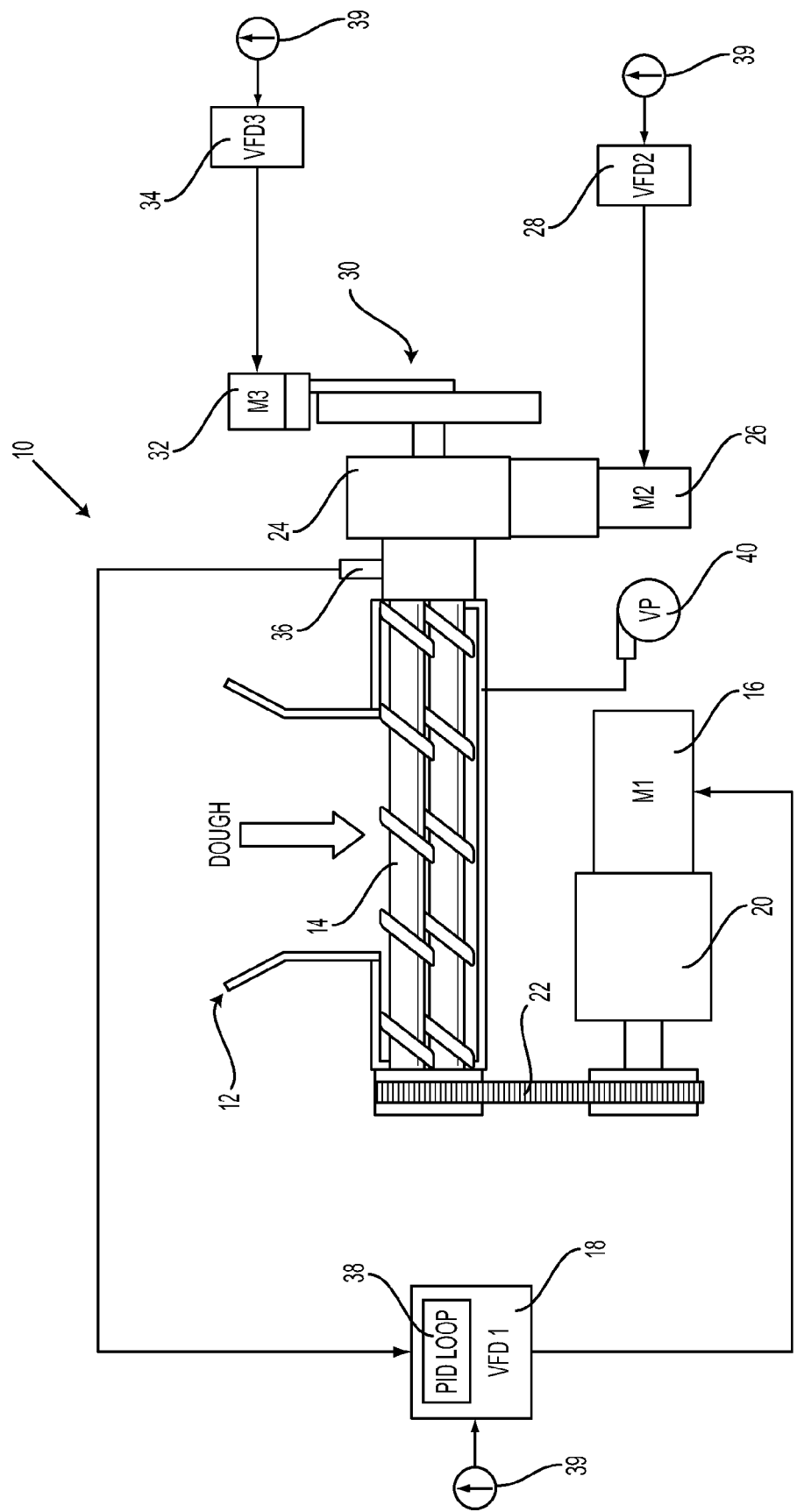
FIG. 1 is a schematic view of a dough extrusion system according to an exemplary embodiment.

Referring to FIG. 1, a dough extrusion system 10 is configured to divide dough (e.g., viscous materials for making bread, buns, biscuits, rolls, dumplings, pastry, cookies, or other dough-based products) into discrete sizes or weights, for example for later packaging, for baking, etc., according to an exemplary embodiment. Dough extrusion system 10 generally includes a hopper 12 that receives dough either in a batch of varying sizes, or metered into the hopper 12 via a conveyor, or pipe and guides it to an auger 14. Auger 14 is actuated by a first motor 16, which is driven by a first variable frequency drive ("VFD") 18, and a gearbox 20 via a chain or belt 22. According to various exemplary embodiments, first motor 16 may be any type of motor capable of actuating auger 14, for example an asynchronous 3-phase AC motor. Auger 14 may include one or more screws that rotate to pass dough to an input of a metering pump(s) 24. The screws may be open screws or closed screws according to various exemplary embodiments. According to some exemplary embodiments, the screws may have varied pitches, for example a pitch between about 6 and 10 degrees. Due to the rotational nature of augers 14, and the operation of the metering pump, the pressure of the dough entering the metering pump 24 varies. This pressure variation oscillates generally along a repeating wave pattern, for example a generally sinusoidal wave or other repeating wave pattern (e.g., see FIG. 8). For example, the dough pressure may vary along a repeating wave pattern between about 20 and 90 pounds per square inch ("PSI") (per revolution), between about 30 and 80 PSI, between about 40 and 70 PSI, between about 50 and 60 PSI, between about 53 and 57 PSI, up to about 65%, up to about 45%, up to about 27%, up to about 10%, up to about 3.5%, or other variation along a repeating wave pattern.

Metering pump(s) 24 is actuated by a second motor(s) 26 driven by a second variable frequency drive(s) 28. According to various exemplary embodiments, metering pump(s) 24 may be a positive displacement pump or any other type of pump capable of receiving dough and outputting the dough at a generally constant rate with minimal variation. Metering pump 24 outputs the dough at a generally constant speed through a pipe and shape to a cutting device or knife(s) 30 (e.g., cutting or slicing device, etc.) that cuts the dough into discrete sizes. Knife 30 is actuated by a third motor(s) 32 driven by a third variable frequency drive(s) 34 and may be any knife capable of cutting dough. A conveyor or other material handling system or apparatus may be located at the output of knife 30.

It is noted that while a single metering pump 24, second motor 26, second variable frequency drive 28, knife 30, third motor 32, and third variable frequency drive 34 are illustrated, according to other exemplary embodiments, system 10 may include more than one of each these components. For example, system 10 may include a manifold coupled to auger 14 for dividing the dough into multiple lines for cutting. Each of the multiple lines may include a respective metering pump, second motor, second variable frequency drive, knife, third motor, and third variable frequency drive 34. In other embodiments, the manifold may be located between the metering pump and the knife, or at the output of the knife.

As the dough passes from auger 14 to metering pump(s) 24, a pressure transducer or sensor 36 measures the pressure of the dough at the input of metering pump 24. An electrical signal representing the pressure reading is sent to a proportional-integral-derivative ("PID") loop controller 38 coupled to first variable frequency drive 18. PID loop 38 and first variable frequency drive 18 then output a signal to first motor or auger motor 16 to adjust the speed of auger 14 to provide an amount or pressure of dough to metering pump 24 with little variance. According to various exemplary embodiments, pressure sensor 36 can be any type of absolute or relative pressure sensor capable of sensing the pressure of the dough at metering pump 24. According to alternative exemplary embodiments, pressure sensor 36 may be replaced by any of a variety of technologies capable of measuring or detecting volume, weight, mass, density, or other characteristic of dough.

PID control loop 38 may receive an input variable in the process being measured (a process variable ("PV")) and compare it to a process setpoint (SP) to eliminate or reduce an error or difference between the process variable and setpoint. The error can be caused by natural tendencies in system 10 or by an external disturbance. PID loop 38 calculates a control variable (CV) that is output to a system device that has influence over the process variable. In the illustrated exemplary embodiments, the setpoint is the desired pressure, the process variable is the actual pressure read from pressure sensor 36, and the control variable is a speed command to auger motor 16 that has a direct effect on the pressure. PID loop 38 may provide a generally constant pressure at the desired setpoint to allow consistent metering by metering pump 24, resulting in more accurate and consistent dough piece weights.

The PID loop mathematics operate on control systems feedback loop theory using three parameters. The "P" in the system is the proportional term used to designate the proportional response of the error between process variable and setpoint. The higher the proportional gain, the larger the response to error. The "I" in the system is the integral term and generally provides a proportional response by analyzing past error values over time. The integral term can reduce error faster than proportional control alone but also can cause the process variable to overshoot after reaching setpoint since it is using past values. The "D" is the derivative term of loop control and provides a response to the error by looking at the rate of change of the error to predict future error values and eliminate them. The derivative term may counteract the integral overshooting but slow down the response as well. The three parameters are generally tuned to values that are appropriate for a particular system, for example dough extrusion system 10. According to various exemplary embodiments, any one of several tuning methods and theories may be used that take into account different parts and types of the dough extrusion process.

Each of first variable frequency drive 18, second variable frequency drive 28, and third variable frequency drive 34 may also be coupled to a manual potentiometer 39 configured to allow an operator to manually adjust the speed of first motor 16, second motor 26, and third motor 32. According to some exemplary embodiments, a vacuum pump 40 may be placed in the auger chamber. Vacuum pump 40 is generally configured to "degas" the dough or remove air pockets in the dough and assist in the movement of dough in hopper 12 into the auger (14). Vacuum pump 40 may be any vacuum pump of past, present, or future design that is capable of removing air. It is noted that according to other exemplary embodiments, vacuum pump 40 may be omitted.

Figure 2:
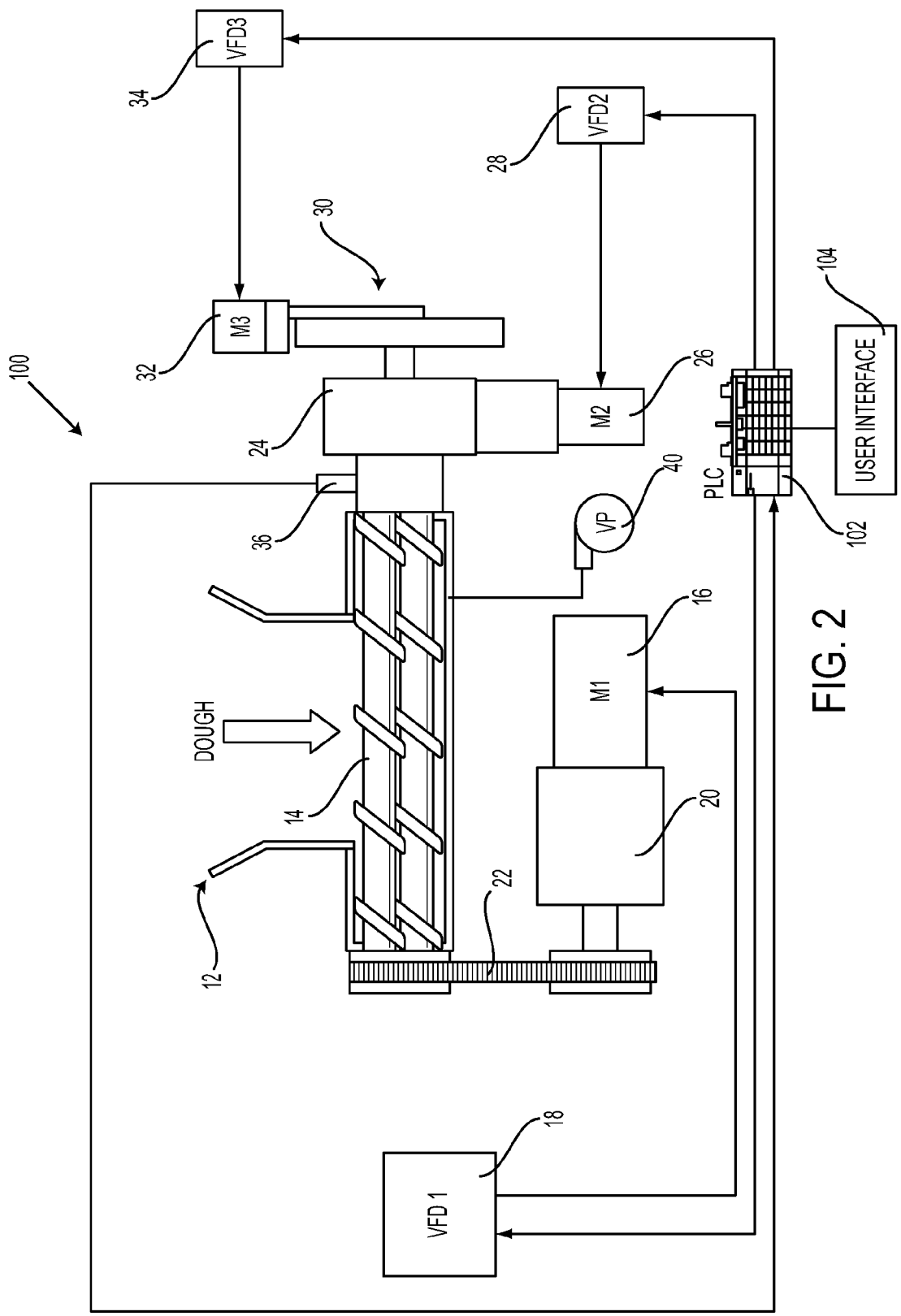
FIG. 2 is a schematic view of a dough extrusion system according to another exemplary embodiment.

Referring to FIG. 2, a dough extrusion system 100 similar to system 10 of FIG. 1 is configured to divide dough into discrete sizes or weights, for example for later packaging, for baking, etc., according to an exemplary embodiment. System 100 includes a programmable logic controller ("PLC") 102 instead of PID controller 38 or including the PID logic. PLC 102 can adjust first, second, and/or third variable frequency drives 18, 28, and/or 34 to control the speed of first motor 16/auger 14, second motor(s) 26/metering pump(s) 24, and/or third motor(s) 32/knife(s) 30 based on pressure readings from pressure sensor 36. According to various exemplary embodiments, PLC 102 can be any PLC of past, present, or future design that is capable of controlling the variable frequency drives or the speed of the motors in extrusion system 100.

PLC 102 may be coupled to a user or operator interface 104 to allow an operator to monitor and adjust the machine more easily. Interface 104 may include a recipe management system to facilitate the storage of operating variables (e.g., in a memory) depending on the type or recipe of dough, including individual PID loops, parameters and allow a more rapid "one step" changeover.

Actuation of the auger screws may cause a natural variation in pressure at metering pump 24. For example, the shape and rotation of the screws may cause a naturally occurring repeating wave pattern effect, reducing the effectiveness of PID loop control and causing variation in the dough pressure at metering pump 24 and reducing the overall accuracy of the Rotary Extrusion Divider scaling weights.

Figure 3:
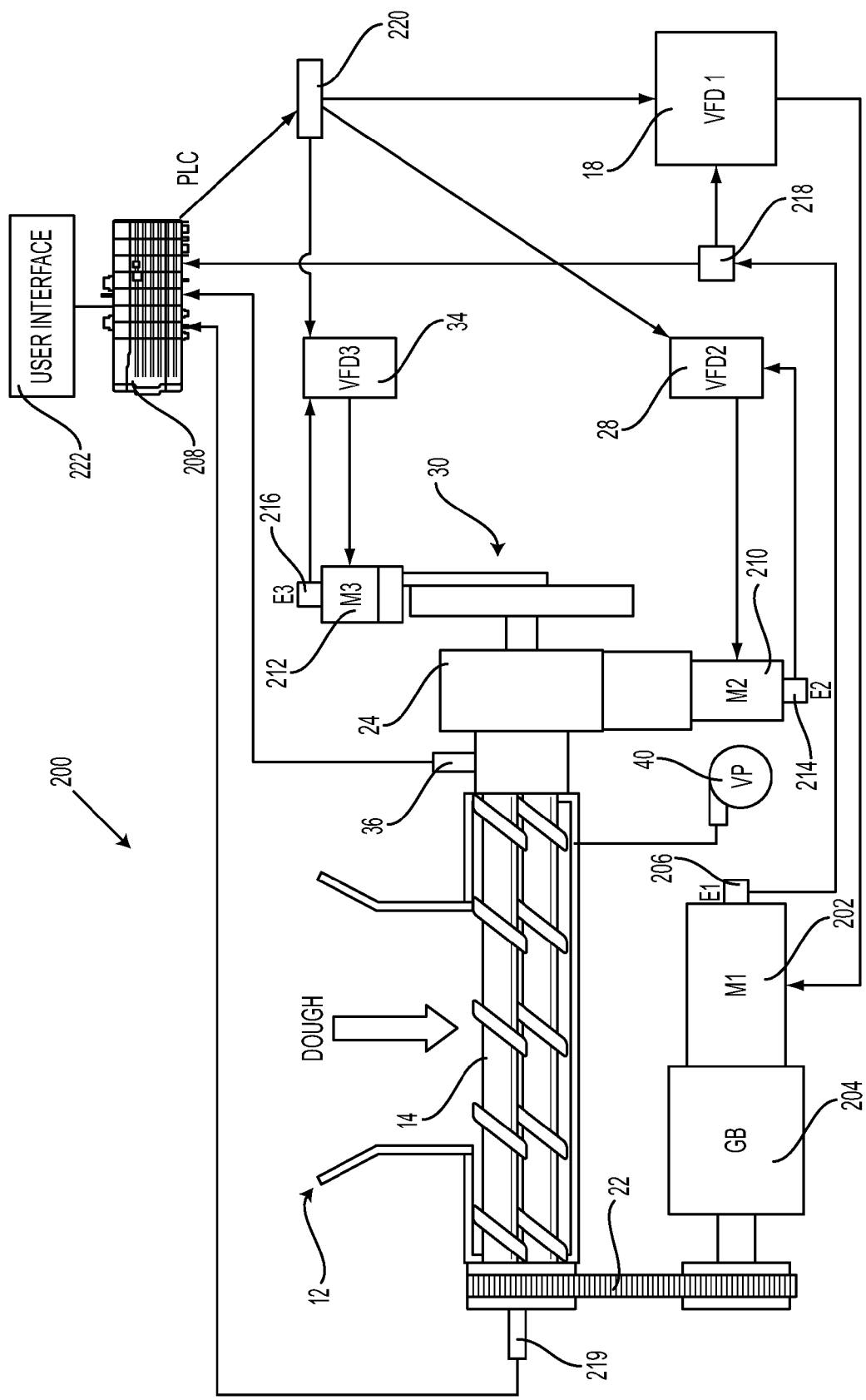
FIG. 3 is a schematic view of a dough extrusion system according to still another exemplary embodiment.

Referring to FIG. 3, a dough extrusion system 200 is configured to divide dough into discrete sizes or weights, for example for later packaging, for baking, etc., according to another exemplary embodiment. Auger 14, metering pump(s) 24, and pressure sensor 36 at the input of metering pump 24 may be generally similar to those like parts of FIGS. 1 and 2.

According to the illustrated exemplary embodiment, a first motor 202 and gearbox 204 (the auger drive motor assembly) may be a servo motor, AC permanent magnet motor, or AC synchronous motor that uses feedback from a first encoder 206 and a zero or close to zero backlash gearbox, respectively. Servo and servo control technology may allow cam profiling to be set up in conjunction with PID control. A controller 208 (e.g., a PLC controller) can use a cam profile to take the shape and rotation of the auger screws into account and counteract the natural cam effect to reduce or eliminate the varying dough pressure. A different cam profile can be setup for each type of dough, if necessary. Gearbox 204 is configured to allow less backlash of the gears and to have higher tolerance for speed change. Gearbox 204 may have a speed ratio of about 50:1, to 25:1, or any other suitable ratio which can be achieved via the gearbox, or pulley ratios from the gearbox to the auger drive. The servo motor and servo control may allow for more precise speed and position control and may permit use of maximum torque throughout the speed range. Alternatively, first motor 202 may be a vector motor with encoder 206 feedback. A second motor 210 and a third motor 212 for metering pump(s) 24 and knife(s) 30 may be vector or servo motors that use feedback from a second encoder 214 and a third encoder 216, respectively. One or more of the motors can also be AC motors with a turn down ratio of 1000:1 or greater.

Use of vector or servo motors for auger, metering pump, and/or knife motors 202, 210, and/or 212 may increase the speed resolution accuracy of system 200. For example, the resolution or speed control accuracy may increase from a range of 0.5%-2% to a range down to 0.001%. The encoders coupled to each motor may be configured to provide a signal to a variable frequency drive and/or PLC 208 that represents an absolute position, an absolute speed, and/or notification of a slip of the respective motor. If PLC 208 receives a signal representative of the motor position, it may calculate the speed based on a history of positions at various times. In the illustrated exemplary embodiments, encoders 214 and 216 coupled to second motor 210 and motor 212, respectively, are configured to provide data to variable frequency drive 28 or 34 controlling the respective motor. Encoder 206 coupled to first motor 202 is configured to provide data to first variable frequency drive 18 and PLC 208 via a signal splitter 218 that sends the data to both variable frequency drive 18 and PLC 208. According to alternative exemplary embodiments, encoders 206, 214, and/or 216 may be omitted and motors 202, 210, and/or 212 can be vector motors that provide vector feedback to the respective variable frequency drive or PLC 208.

Auger 14 may also be coupled to a "home" reference or cam proximity switch 219 configured to reset the position of auger 14 screws to an original home or reference position. PLC 208 may communicate with switch 219 to control when auger 14 is reset. By resetting auger 14 to the reference position, PLC 208 knows the position of auger 14 and, with variable frequency drive 18, can more accurately adjust motor 202 and the speed and position of auger 14.

It is noted that while a single metering pump 24, second motor 210, second variable frequency drive 28, third motor 212, third variable frequency drive 34, second encoder 214, third encoder 216, and knife 30 are illustrated, according to other exemplary embodiments, system 200 may include more than one of each these components. For example, system 200 may include a manifold coupled to auger 14 for dividing the dough into multiple lines for cutting. Each of the multiple lines may include a respective metering pump 24, second motor 210, second variable frequency drive 28, third motor 212, third variable frequency drive 34, second encoder 214, third encoder 216, and knife 30.

The motors may operate in a given frequency band, for example up to about 70 Hz, between about 60 and 70 Hz, between about 63.5 and 63.9 Hz, at a frequency modulating up to about 1.5 Hz, etc. For a range between about 63.5 and 63.9 Hz with a modulation of 0.4 Hz, a conventional resolution of 1% leaves an error of up to about 0.64 Hz, which is greater than the typical modulation of the motor. By increasing the resolution to 0.001%, in the same example, the error may be only 0.00064 Hz, which is well within the operating range of the motor.

The encoder data sent to PLC 208 may be used in conjunction with the pressure data from pressure sensor 36 to determine the speed that each motor should be run at a given point in time. PLC 208 is configured to send control signals (e.g., digital, analog, etc.) to variable frequency drives 18, 28, and 34 via a switch 220. Switch 220 is configured to route PLC 208 signals to the appropriate one or more variable frequency drives to drive the motors and deliver a generally constant dough pressure for cutting. According to some exemplary embodiments, switch 220 may be an Ethernet switch and the control signals may be sent to variable frequency drives 18, 28, and 34 with an Ethernet communication protocol. According to another exemplary embodiment, the control signal may be a direct analog control signal that is readable by PLC 208. According to other exemplary embodiments, the communication protocol between PLC 208 and the variable frequency drives may be another serial, parallel, USB, Firewire, WiFi, WiMAX, Bluetooth, RF, Control Net, Device Net, Remote IO, DH485, CAN, any other wired or wireless protocol, or any protocol capable of facilitating communication between PLC 208 and variable frequency drives 18, 28, and 34. In these exemplary embodiments, switch 220 may be any appropriate switch capable of routing the communication signals.

PLC 208 may be coupled to a user or operator interface 222 to allow an operator to monitor and adjust the machine more easily. Interface 222 may include a recipe management system to facilitate the storage of operating variables (e.g., in a memory) depending on the type or recipe of dough, including individual PID loops, parameters and allow a more rapid "one step" changeover.

According to some exemplary embodiments, vacuum pump 40 may be placed in the auger chamber and auger 14. Vacuum pump 40 is generally configured to "degas" the dough or remove air pockets in the dough and assist in dough entering the auger chamber. Vacuum pump 40 may be any vacuum pump of past, present, or future design that is capable of removing air pockets in dough. It is noted that according to other exemplary embodiments, vacuum pump 40 may be omitted.

Figure 4:
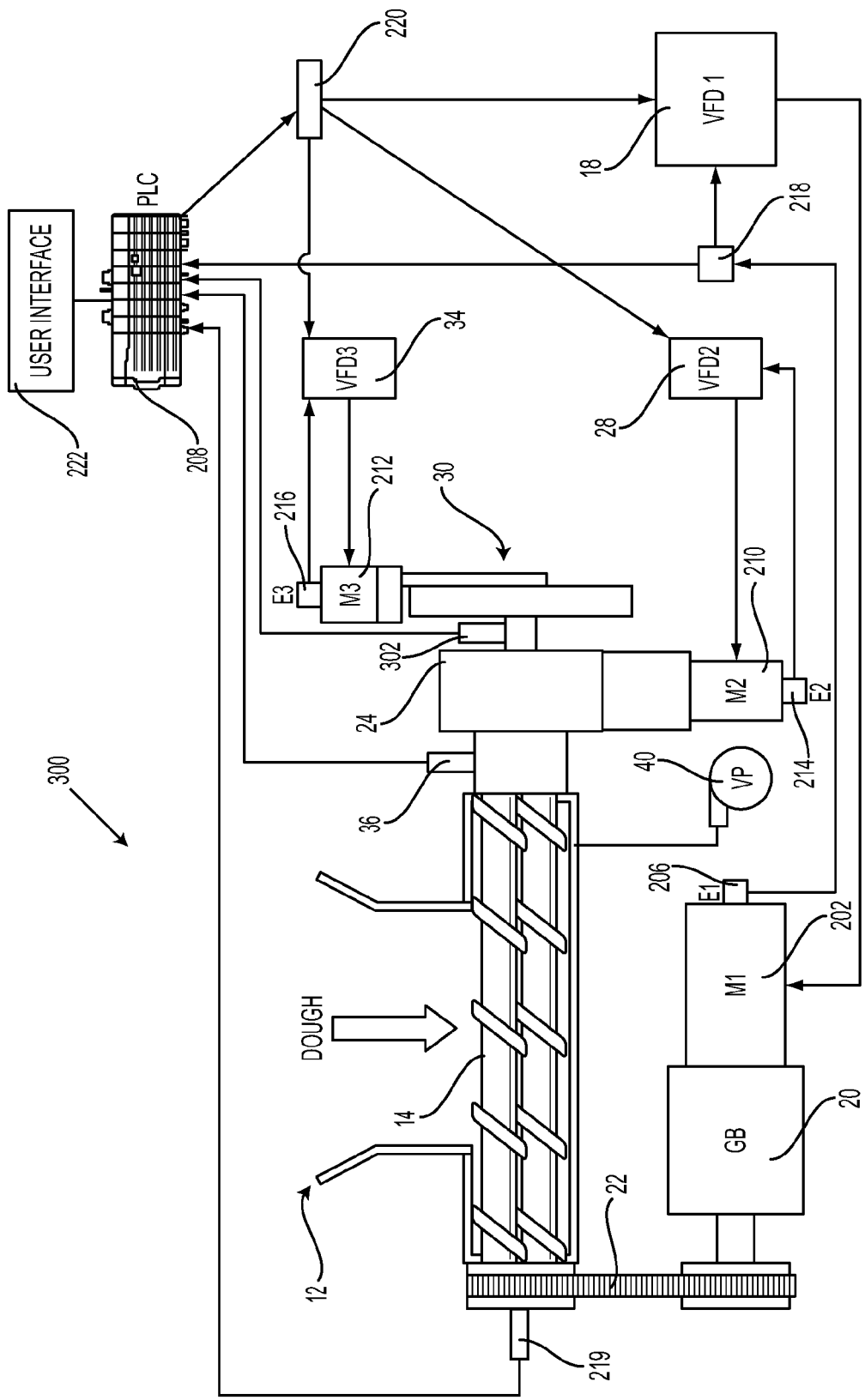
FIG. 4 is a schematic view of a dough extrusion system according to a further exemplary embodiment.

Referring to FIG. 4, a dough extrusion system 300 similar to system 200 of FIG. 3 is configured to divide dough into discrete sizes or weights, for example for later packaging, for baking, etc., according to an exemplary embodiment. Dough extrusion system 300 includes a second pressure sensor 302 at the output of each metering pump 24 to provide PLC 208 with a second pressure reading. The second pressure reading may allow for greater control over dough extrusion system and may allow for isolation as to where any variance is occurring. For example, PLC 208 may be able to determine whether a variance is primarily due to the actuation of auger 14 or due to actuation of metering pump 24.

Figures 5, 6:
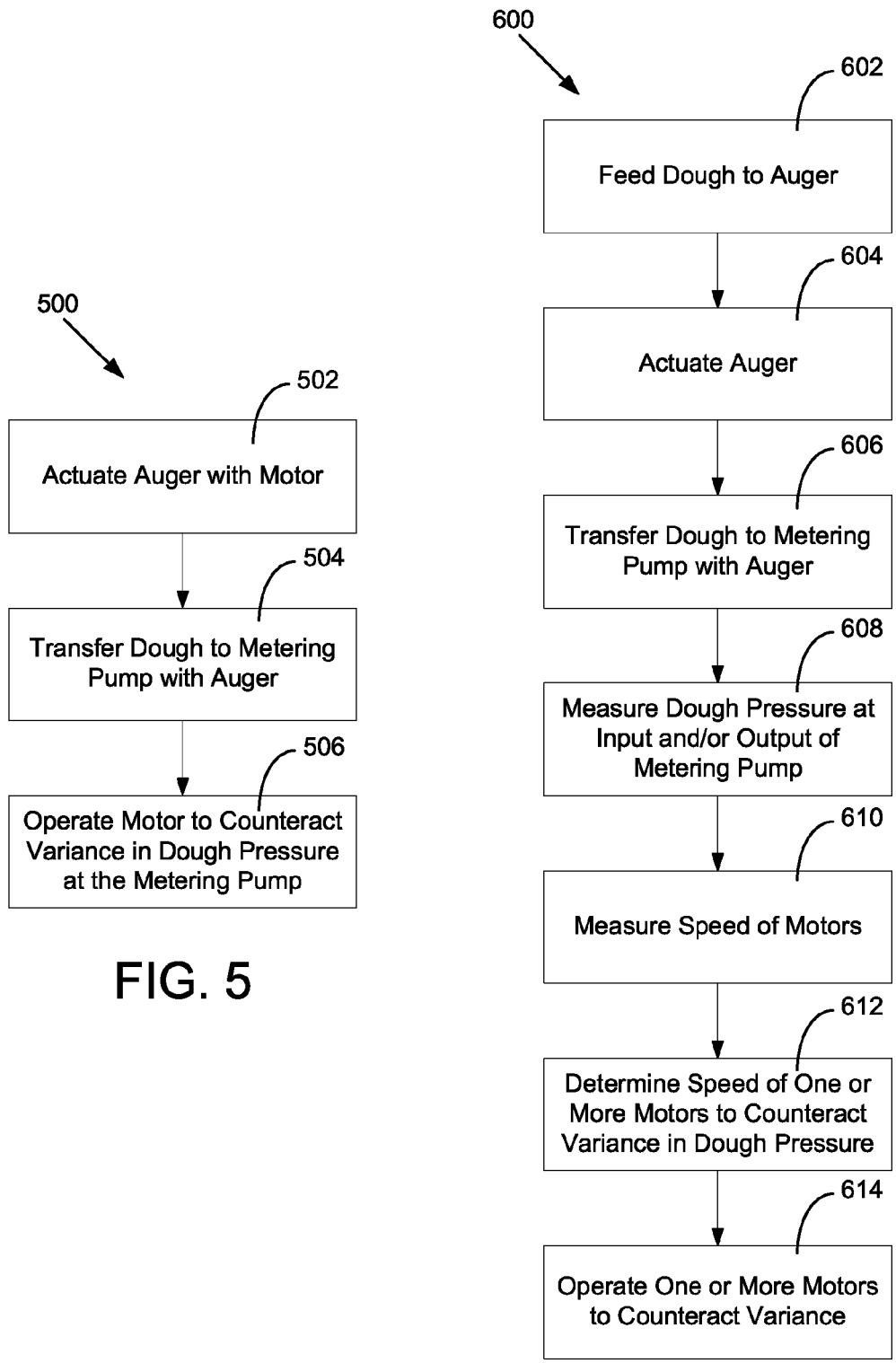
FIG. 5 is a flow diagram of a dough extrusion method according to an exemplary embodiment.
FIG. 6 is a flow diagram of a dough extrusion method according to another exemplary embodiment

Referring to FIG. 5, a method 500 for counteracting variance in dough pressure or weight in a dough extrusion system (e.g., dough extrusion system 10, 100, 200, and/or 300) is shown, according to an exemplary embodiment. Auger 14 of the dough extrusion system is actuated by motor 16 or 202 (step 502), transferring dough to metering pump 24 (step 504). Motor 16 or 202 for actuating the auger is operated to counteract variance in dough pressure at metering pump 24 (e.g., before and/or after metering pump 24) (step 506). According to various exemplary embodiments, the operation of motor 16 or 202 may be adjusted at various intervals, for example at about 1 second intervals, at about 10 second intervals, at about 100 millisecond intervals, at about 10 millisecond intervals, etc.

Referring to FIG. 6, a method 600 for counteracting variance in dough pressure in a dough extrusion system (e.g., dough extrusion system 10, 100, 200, and/or 300) is shown, according to another exemplary embodiment. Dough is fed to auger 14 (e.g., from hopper 12) (step 602) and actuation of auger 14 (step 604) transfers the dough to metering pump 24 (step 606). The system measures the pressure of the dough at the input and/or output of metering pump 24 at a predetermined interval (step 608). The speed of one or more motors in the system is measured (step 610), for example by encoders or by vector feedback at the same or a different predetermined interval as the dough pressure measurement. A controller (e.g., PLC 208, PID loop 38, etc.) determines an appropriate speed or adjustment to the speed for each of the one or more motors that may at least partially counteract a measured variance in dough pressure (step 612), for example motors 16, 26, and 32 or motors 202, 210, and 212. The system then operates the one or more motors to be adjusted (e.g., via variable frequency drives) to counteract the variance in dough pressure (step 614). It is noted that the actuation of auger 14 and/or metering pump 24 may be independent of the measuring of dough pressure and motor speed.

The above described dough extrusion systems are configured to reduce the variance in dough pressure moving through the system, thereby reducing the amount of excess or additional dough included with each dough division according to statistical models of the accuracy and precision of the system performance. Specifically, the systems may compensate (i.e., counteract, offset, neutralize, balance, make up for, etc.) for a variance in dough pressure (e.g., repeating wave pattern) caused by the rotation of the auger 14. For example, the PLC or PID loop may detect the pressure variance via the first sensor and/or the second sensor. The PLC or PID loop may then adjust one or more of the motors accordingly to compensate for or counteract the pressure variance, for example by reading the speed and/or position of the motor by reading an encoder and adjusting the phase of the motor to counteract the phase of the auger. Because the pressure variance may not perfectly match a mathematical repeating wave pattern (e.g., a sinusoidal wave), the PLC or PID loop may use the pressure and encoder readings to adjust the motors to compensate for or counteract the variance. Alternatively, in some exemplary embodiments, the variance may be very similar to a mathematical repeating wave pattern (e.g., a sinusoidal wave) and PLC or PID loop may automatically execute operations or a program to cause the motors to compensate for or counteract an expected mathematical pattern.

Control of dough metering pump 24 input pressure for divider system 300 and 400 may be accomplished by precise and constant dough material flow from dough auger 14 to metering pump 24. By its nature, an auger has a repeating wave pattern material flow effect and may even include a portion where reduced or no material flow occurs.

The pressure variance compensation function described above may use a variety of control profile technologies to offset the mechanical auger 14 repeating wave pattern material flow pattern. The pressure variance compensation hardware may include the use of programmable logic controller 208 (e.g., such as commercially available from AB Control Logix), a closed loop controller (e.g., a servo controller residing in PLC 208), an AC variable frequency drive (e.g., variable frequency drive 18, 28, and/or 34), and an AC asynchronous motor (e.g., motor 202, 210, 212, and/or a servo motor), for example having an encoder (e.g., encoders 206, 214, 216, and/or a 1024 pulse per revolution quadrature encoder) and reduction gearbox (e.g., gearbox 204). According to some exemplary embodiments, the control profile technology used may be configured to electronically represent a mechanical cam or other modulation effect.

An additional PID (Proportional, Integral, and Derivative) control loop located in PLC 208 may be used to adjust the speed of the control profile to maintain the output of auger 14 at a generally constant pressure set point. This PID loop uses auger pressure sensor 36 located at the input of metering pump 24 as the process variable and the control profile speed as the control variable.

Figure 7:
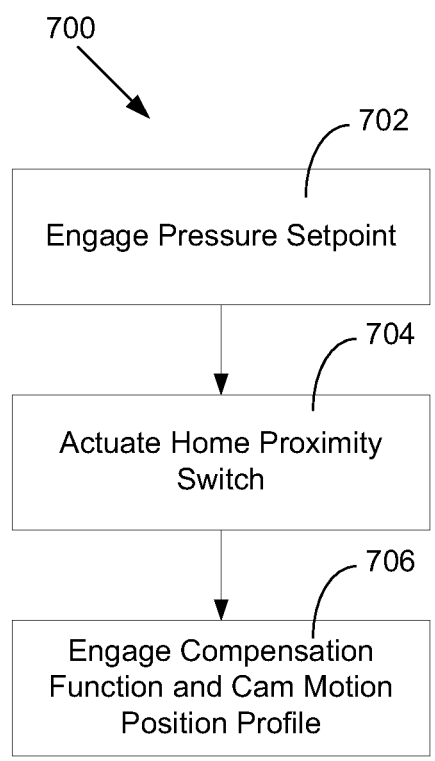
FIG. 7 is a flow diagram of a pressure variance compensation method according to an exemplary embodiment.

Referring to FIG. 7, the control functions are sequenced in programmable controller 208 using a method 700. First, PLC 208 sets/initiates the pressure set point for the PID, which then defines the speed of auger 14 (step 702). Second, the portion of auger 14 where reduced or no material flow occurs is located and controlled. This is accomplished by actuating reference proximity switch 219 located on the drive pulley of auger 14 (step 704). Once the pressure variance compensation function is engaged, proximity switch 219 may locate the "home" or reference position dynamically while auger 14 is moving and may provide the reference position to the closed loop position controller in PLC 208. Third, once the reference position is located, PLC 208 engages the pressure variance compensation function automatically and engages a predefined electronic position control profile synchronized to the reference position (step 706). This pressure variance compensation function repeats with every revolution of auger 14 and drives the speed of the motor in a repeating wave pattern profile (e.g., speed/velocity, etc.) to offset the mechanical effect of auger 14. The predefined control profile (e.g., to compensate for a generally sinusoidal or other repeating wave pattern) may be updated based on measurements taken by pressure sensor 36 and/or pressure sensor 302.

By this method, the repeating wave pattern material flow effect may be offset by the position controller in PLC 208 and the pressure set point may be attained by use of the PID resulting in reduced variation of metering pump 24 input pressure and less variation in the material flow to metering pump 24.

Figure 8:
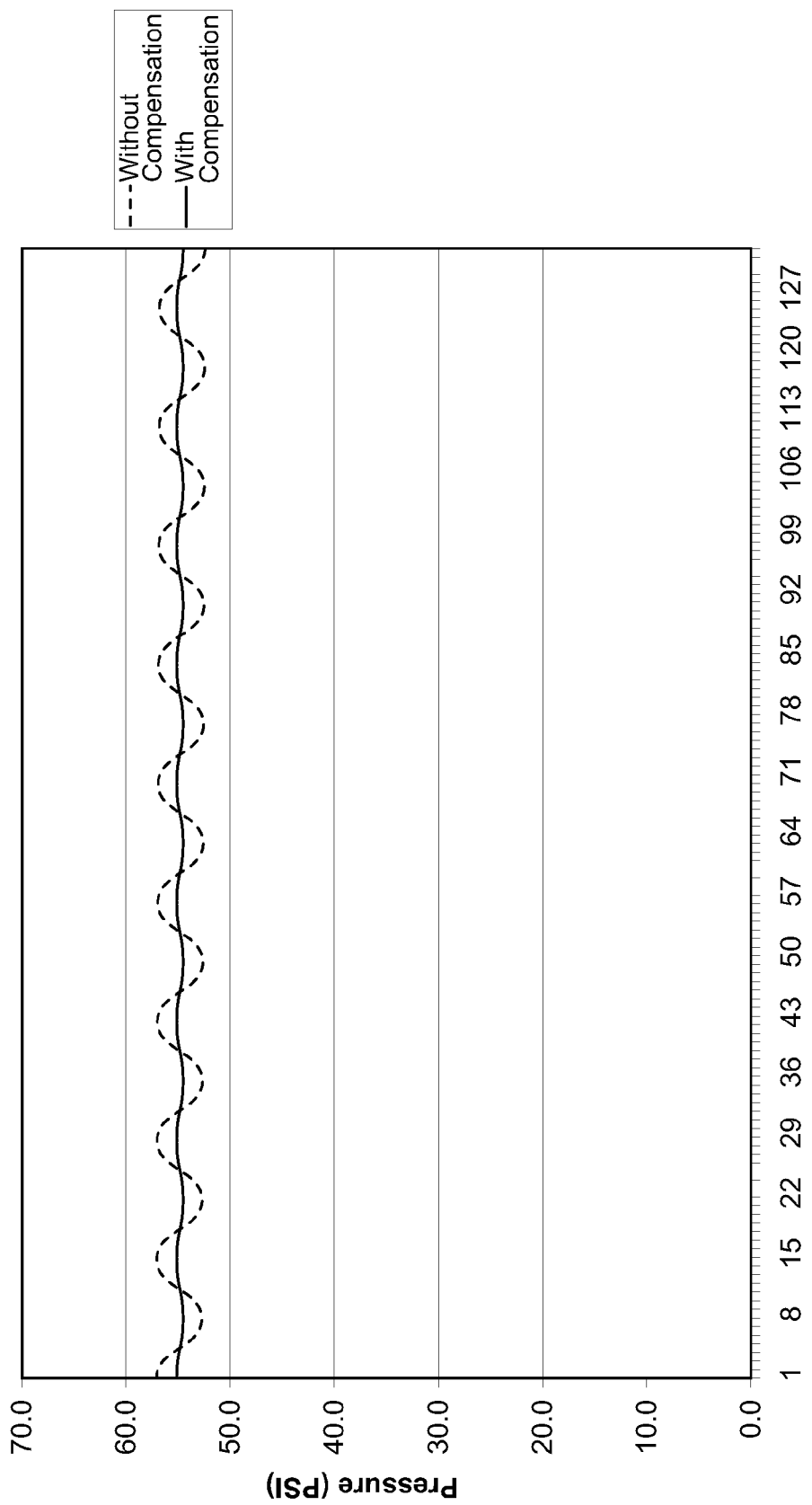
FIG. 8 is an exemplary illustration of a potential improvement by implementing encoders and pressure variance compensation.

FIG. 8 is an exemplary illustration of a potential improvement in dough pressure by implementing encoders and pressure variance compensation. The graph illustrates a potential comparison of dough pressures between a system using pressure variance compensation (e.g., system 200, system 300, etc.) and a system not using encoders or pressure variance compensation, according to one exemplary embodiment. The system not using encoders or pressure variance compensation includes a dough pressure (e.g., as measured by sensor 36) having a repeating wave pattern over a number of sample points or for each revolution of the screws of auger 14. For example, the dough pressure may vary along a repeating wave pattern between about 20 and 90 PSI (per revolution), between about 30 and 80 PSI, between about 40 and 70 PSI, between about 50 and 60 PSI, between about 53 and 57 PSI, up to about 65%, up to about 45%, up to about 27%, up to about 10%, up to about 3.5%, or other repeating wave pattern variation.

The system using encoders or pressure variance compensation generally has less variation in dough pressure (e.g., as measured by sensor 36). For example, the dough pressure may have a variance of up to about 2%, up to about 1.5%, up to about 1%, less than 1%, etc. It is noted that although specific pressures and pressure variances have been illustrated, according to other exemplary embodiments, lower or higher pressures or pressure variances may be realized depending on the type of dough and the specific system configuration, however the variance is generally decreased in the system compensating for or counteracting the repeating wave pattern effects.

Figure 9:
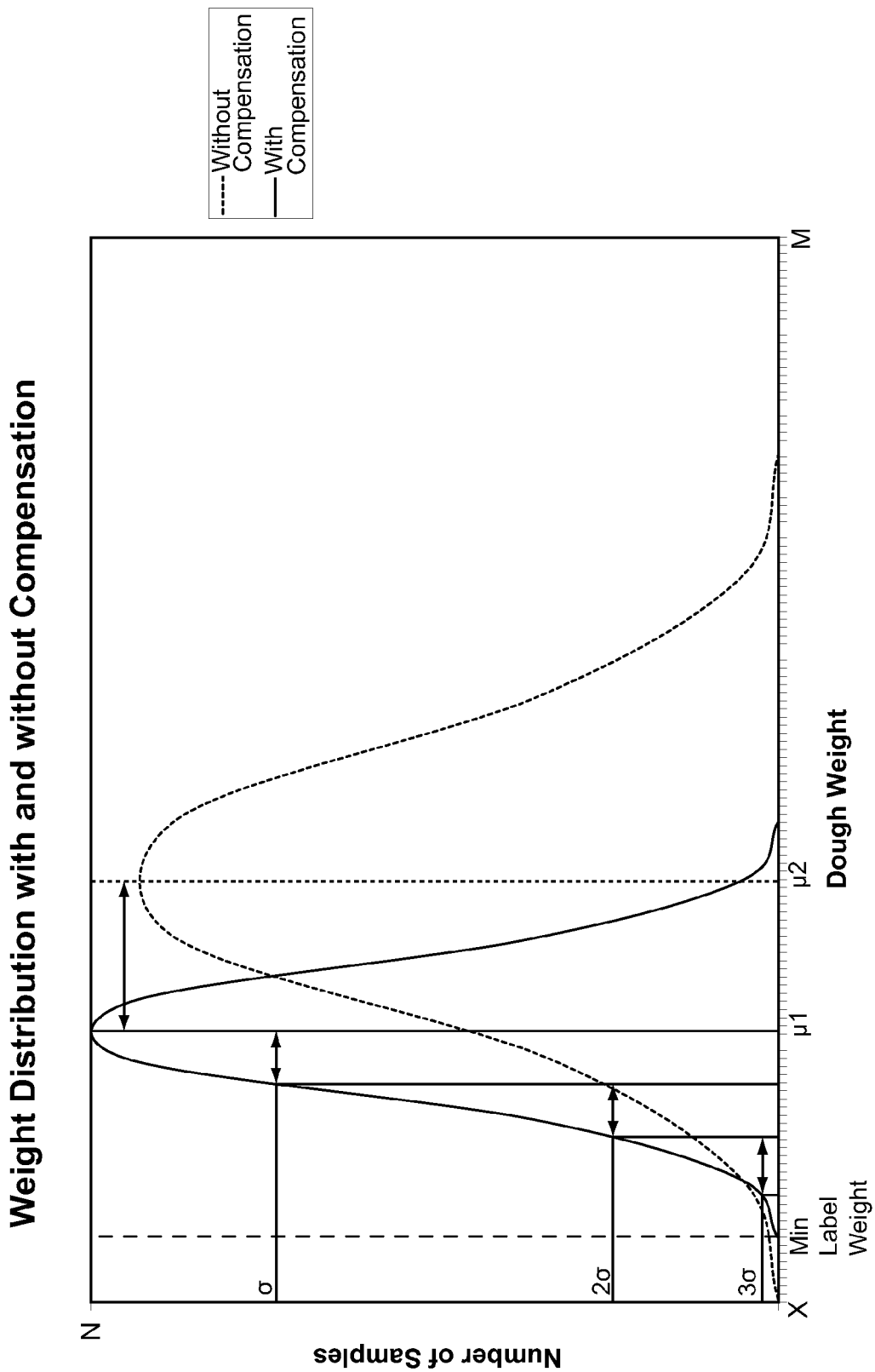
FIG. 9 is an exemplary illustration of another potential improvement by implementing encoders and pressure variance compensation.

FIG. 9 is an exemplary illustration of a potential improvement in dough weight distribution by implementing encoders and/or pressure variance compensation. The graph illustrates a potential distribution of dough weights for a system using encoders and pressure variance compensation (e.g., system 200, system 300, etc.) and a system not using encoders or pressure variance compensation, according to one exemplary embodiment. The system not using encoders or pressure variance compensation includes a dough pressure (e.g., as measured by sensor 36) having a repeating wave pattern over a number of sample points or revolutions of the screws of auger 14, as described above. This variation in dough pressure causes a greater variation or distribution of dough weights after being cut by knife 30. Because the system using encoders and pressure variance compensation generally has less variation in dough pressure, it may also allow for less distributed weights of dough pieces closer to a minimum cut-off weight ("minimum label weight") that is required to meet the weight provided on the product packaging. For example, the savings provided by the encoders and the pressure variance compensation can be estimated by ($\mu 2-\mu 1$).

As illustrated, the system not using encoders or compensating for repeating wave pattern effects has a mean dough weight that is higher than the mean dough weight in a system that does compensate for the repeating wave pattern effects. Further, the system not compensating for repeating wave pattern effects has $1^{st}$, $2^{nd}$, and $3^{rd}$ sigma or standard deviation values that are higher than those of the system that does compensate. By compensating for or counteracting repeating wave pattern effects, a lower weight of dough may be cut-off by knife 30 while still meeting the minimum cut-off weight requirements/goals. Because less dough is used, the cost of producing the product may be reduced with the decreased weight, for example the cost may be reduced by the difference between ($\mu 2-\mu 1$) such as in the example of FIG. 9.

It is important to note that the terms "motor," "variable frequency drive," "auger," "knife," and "metering pump" are intended to be broad terms and not terms of limitation. These components may be used with any of a variety of dough products or arrangements and are not intended to be limited to use with dough applications. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Such joining may also relate to mechanical, fluid, or electrical relationship between the two components.

It is also important to note that the construction and arrangement of the elements of the dough extrusion system as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, while the components of the disclosed embodiments will be illustrated as a system and process designed for a dough product, the features of the disclosed embodiments have a much wider applicability—the dough extrusion system design is adaptable for other dough products that are metered and/or cut. Further, the size of the various components and the size of the containers can be widely varied. Accordingly, all such modifications are intended to be included within the scope of the present invention. The order or sequence of any process or method steps may be varied or re-sequenced according to alternative embodiments. Other substitutions, modifications, changes and/or omissions may be made in the design, operating conditions and arrangement of the preferred and other exemplary embodiments without departing from the spirit of the present invention.

What is claimed is:

1. A system for extrusion of dough, the system comprising:
   an auger;
   a metering pump comprising an input;
   a first motor for actuating the auger to transfer dough to the input of the metering pump;
   a controller adapted to control operation of the first motor;
   a pressure sensor adapted to detect a pressure of the dough in accordance with a first set of intervals and adapted to transmit a signal associated with the pressure to the controller;
   wherein the controller operates the first motor to at least partially compensate for a variance in the pressure of dough by driving the first motor in accordance with a repeating wave pattern profile to adjust speed of the auger throughout at least every single revolution of the auger in accordance with a second set of intervals.

2. The system of claim 1, wherein the variance in the pressure of the dough is a repeating wave pattern variance.

3. The system of claim 2, wherein the repeating wave pattern is a generally sinusoidal wave pattern.

4. The system of claim 1, further comprising a first encoder for reading a position or speed of the first motor and for transmitting a signal associated with the position or speed of the first motor.

5. The system of claim 4, wherein the controller is adapted to receive the signal from the first encoder and the signal from the pressure sensor to control operation of the first motor.

6. The system of claim 5, further comprising:
a second motor for actuating the metering pump;
a third motor for actuating a knife for cutting the extruded dough;
a second encoder for reading a position or speed of the second motor and for transmitting a signal associated with the position or speed of the second motor; and
a third encoder for reading a position or speed of the third motor and for transmitting a signal associated with the position or speed of the third motor,
wherein the controller operates the first, second, and third motors based on the signal associated with the variance in pressure and based on the signals received from the first, second, and third encoders.

7. The system of claim 6, wherein at least one of the first motor, second motor, and third motor is a variable frequency drive motor.

8. The system of claim 1, wherein the controller comprises a closed loop feedback system configured to process the signal associated with the pressure oscillation to generate a dough extrusion control signal following a predetermined decrease or a predetermined increase in the magnitude of pressure detected by the pressure sensor.

9. The system of claim 1, wherein the controller is adapted to store magnitudes of pressure detected by the pressure sensor that correspond to dough extrusion cycle endpoints.

10. The system of claim 1, wherein the controller is a programmable logic controller.

11. The system of claim 1, further comprising a hopper adapted to contain dough transferred by the auger to the metering pump.

12. The system of claim 1, further comprising a proximity switch adapted to reset the position of the auger to a reference position.

* * * * *